No. 832,890. PATENTED OCT. 9, 1906.
W. H. ZELLERS.
LOOPER HOOK.
APPLICATION FILED MAY 13, 1905.

WITNESSES:
W. H. Canby.
S. G. Doyle.

INVENTOR
William H. Zellers
BY
A. V. Groupy
ATTORNEY.

UNITED STATES PATENT OFFICE.

WILLIAM H. ZELLERS, OF PHILADELPHIA, PENNSYLVANIA.

LOOPER-HOOK.

No. 832,890.  Specification of Letters Patent.  Patented Oct. 9, 1906.

Application filed May 13, 1905. Serial No. 260,345.

*To all whom it may concern:*

Be it known that I, WILLIAM H. ZELLERS, a citizen of the United States, residing at Philadelphia, in the county of Philadelphia and State of Pennsylvania, have invented certain new and useful Improvements in Looper-Hooks, of which the following is a specification.

This invention relates to looper-hooks adapted for use in connection with the stitch-forming mechanism of sewing-machines. These looper-hooks, as generally stated, comprise a shank and one or more thread-engaging members projecting from the shank.

The object of my present invention is to provide a simple and efficient construction of looper-hook whereby the thread-engaging member or members thereof may be easily and quickly detached from the shank and new ones substituted therefor.

The invention consists in the novel construction and arrangements of parts hereinafter fully described, and particularly pointed out in the claims.

Figure 1:
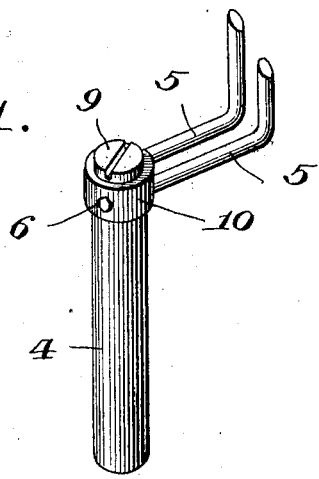
Figure 2:
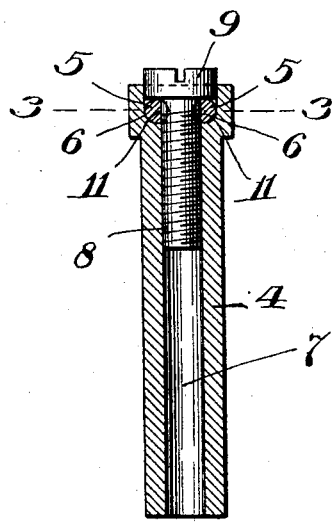
Figure 3:
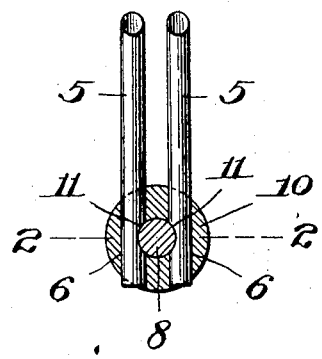
Figure 4:
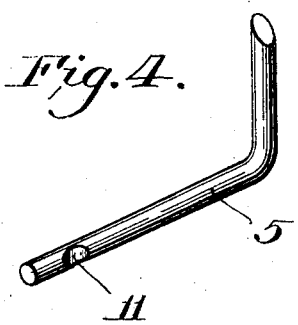

In the drawings, Figure 1 is a perspective view of my improved looper-hook. Fig. 2 is a vertical section thereof as on the line 2 2 of Fig. 3. Fig. 3 is a horizontal section as on the line 3 3 of Fig. 2. Fig. 4 is a perspective view of one of the thread-engaging members.

4 designates the shank of the hook, which is adapted to be secured to the hook-actuating part of the stitch-forming mechanism of a sewing-machine requiring a looper-hook, which machines are common and well known.

5 5 designate two thread-engaging members which extend into transverse openings 6 6 in a head 10, formed on one end of the shank.

The shank 4 is provided with an axial opening 7, into which and between the members 5 5 extends a screw 8. This screw is provided with a head 9, extending over the members 3 5 and adapted to simultaneously engage said members to secure them to the shank 4 when the screw 8 is screwed into the opening 7, the head 10 of the shank being countersunk to receive the head 9 of the screw.

The space between the members 5 5 is somewhat less than the diameter of the screw 8, and the members 5 5 are provided with transverse grooves 11 11, corresponding with the sides of the screw 8, extending outwardly beyond the inside lines of the members. These grooves 11 11 are adapted to receive the screw 8 to prevent longitudinal and rocking movement of the thread-engaging members with respect to the shank 4, and the grooves 11 11 are positioned upon the members 5 5 with respect to the screw 8 to provide for the accurate setting of the thread-engaging members relatively to the shank.

By the construction just described it will be seen that by removing the screw 8 either or both of the thread-engaging members 5 5 may be removed from the shank and a new one or new ones not only readily substituted therefor, but also accurately set in position with respect to the shank.

I claim—

1. A looper-hook comprising a shank, two thread-engaging members adapted to be detachably secured thereto, and a common means adapted to simultaneously engage said members and rigidly secure them to the shank.

2. A looper-hook comprising a shank, two thread-engaging members adapted to be detachably secured thereto, and a common means adapted to enter between and to simultaneously engage said members to secure them to the shank.

3. A looper-hook comprising a shank having an opening therein to one side of the axis thereof, a thread-engaging member extending into said opening and having a groove therein, and a screw entering the axis of said shank and engaging the groove of said member to detachably secure the member to the shank.

4. A looper-hook comprising a shank, two thread-engaging members each of which has a groove therein and is adapted to be detachably secured to the shank and a common means adapted to simultaneously enter said grooves and engage said members to secure them to the shank.

5. A looper-hook comprising a shank, two thread-engaging members adapted to be detachably secured thereto, and a screw entering the shank and provided with a head adapted to simultaneously engage said members and rigidly secure them to the shank 6. A looper-hook comprising a shank having openings therein, two thread-engaging members each of which is adapted to extend into one of said openings to be detachably secured to the shank, and a common means adapted to simultaneously engage said members to secure them to the shank.

7. A looper-hook comprising a shank having openings therein, two thread-engaging members each of which is adapted to extend into one of said openings to be detachably secured to the shank, and a screw entering the shank and provided with a head adapted to simultaneously engage said members to secure them to the shank.

In testimony whereof I affix my signature in presence of two witnesses.

WILLIAM H. ZELLERS.

Witnesses:
A. V. GROUPE,
S. G. DOYLE.